(12) United States Patent
Oda

(10) Patent No.: US 10,437,225 B2
(45) Date of Patent: Oct. 8, 2019

(54) FEED SHAFT CONTROL METHOD AND NUMERICALLY CONTROLLED MACHINE TOOL

(71) Applicant: MAKINO MILLING MACHINE CO., LTD., Tokyo (JP)

(72) Inventor: Mitsunari Oda, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/515,533

(22) PCT Filed: Sep. 30, 2014

(86) PCT No.: PCT/JP2014/076220
§ 371 (c)(1),
(2) Date: Mar. 29, 2017

(87) PCT Pub. No.: WO2016/051542
PCT Pub. Date: Apr. 7, 2016

(65) Prior Publication Data
US 2017/0220023 A1    Aug. 3, 2017

(51) Int. Cl.
*G05B 19/404* (2006.01)
*G05B 19/416* (2006.01)
(Continued)

(52) U.S. Cl.
CPC ......... *G05B 19/404* (2013.01); *B23Q 15/007* (2013.01); *G05B 19/416* (2013.01);
(Continued)

(58) Field of Classification Search
CPC .... G05B 19/404; G05B 19/19; G05B 19/416; G05B 2219/41154; B23Q 15/007; B23Q 15/013; H02P 27/00
(Continued)

(56) References Cited

U.S. PATENT DOCUMENTS 5,751,585 A * 5/1998 Cutler .................. B23K 26/083
318/571
5,801,939 A    9/1998 Okazaki
(Continued)

FOREIGN PATENT DOCUMENTS

JP          5-66839           3/1993
JP       H0566839 A  *    3/1993
(Continued)

OTHER PUBLICATIONS

International search report dated Jan. 13, 2015, directed to PCT Application No. PCT/JP2014/076220; 2 pages.

*Primary Examiner* — Brian W Wathen
*Assistant Examiner* — Alicia M. Choi
(74) *Attorney, Agent, or Firm* — Morrison & Foerster LLP

(57) ABSTRACT

A numerically controlled machine tool in which a numerical control program acquired from a reading and interpreting unit of a numerical control device is executed by a distribution interpolating unit and servo control units, to drive a feed shaft configured from a coarse movement mechanism and a fine movement mechanism, causing a tool to move relative to a workpiece, and thereby machining the workpiece, wherein the difference between a movement command for the feed shaft, and an output value which varies on the basis of said movement command is obtained, a movement command for the coarse movement mechanism is generated on the basis of said movement command, and a movement command for the fine movement mechanism is generated on the basis of said difference.

4 Claims, 7 Drawing Sheets

(51) Int. Cl.
- *B23Q 15/007* (2006.01)
- *H02P 27/00* (2006.01)
- *H02P 6/16* (2016.01)
- *H02P 23/12* (2006.01)
- *B23Q 15/013* (2006.01)

(52) U.S. Cl.
CPC ............... *H02P 6/16* (2013.01); *H02P 23/12* (2013.01); *H02P 27/00* (2013.01); *B23Q 15/013* (2013.01); *G05B 2219/41154* (2013.01); *G05B 2219/42225* (2013.01)

(58) Field of Classification Search
USPC .......................................................... 700/188
See application file for complete search history.

(56) References Cited

U.S. PATENT DOCUMENTS

| | | | | |
|---|---|---|---|---|
| 6,706,999 | B1 * | 3/2004 | Barrett | B23K 26/02 219/121.74 |
| 8,060,239 | B2 | 11/2011 | Hoffmann et al. | |
| 2004/0179290 | A1 * | 9/2004 | Kohso | G11B 5/556 360/78.05 |
| 2007/0278980 | A1 * | 12/2007 | Wilson | G05B 19/25 318/573 |
| 2013/0194697 | A1 * | 8/2013 | Hironaka | G11B 5/5582 360/75 |
| 2014/0371916 | A1 * | 12/2014 | Nagaoka | B23Q 15/013 700/275 |
| 2015/0168290 | A1 * | 6/2015 | Shachaf | G02B 7/28 356/369 |

FOREIGN PATENT DOCUMENTS

| | | |
|---|---|---|
| JP | 6-752 | 1/1994 |
| JP | 8-241128 | 9/1996 |
| JP | 9-16265 | 1/1997 |
| JP | 10-506211 | 6/1998 |
| JP | 3040448 | 3/2000 |
| JP | 2001-312309 | 11/2001 |
| JP | 2004-188541 | 7/2004 |
| JP | 2013-69123 | 4/2013 |
| WO | WO-2013/118404 | 8/2013 |

* cited by examiner

FEED SHAFT CONTROL METHOD AND NUMERICALLY CONTROLLED MACHINE TOOL

CROSS-REFERENCE TO RELATED APPLICATIONS

This application is a U.S. National Stage patent application of International Patent Application No. PCT/JP2014/076220, filed on Sep. 30, 2014, which is hereby incorporated by reference in the present disclosure in its entirety.

FIELD OF THE INVENTION

The invention relates to a method of controlling a feed axis of a machine tool and a numerically controlled machine tool configured to carry out the feed axis controlling method.

BACKGROUND OF INVENTION

In the control of a feed axis of a machine tool, when carrying out machining commands, impacts may be generated at parts of the machine tool due to sudden changes in the velocities of the feed axes. In order to reduce such impacts, an acceleration/deceleration control for feed axes is performed. The acceleration/deceleration control includes for example a post-interpolation acceleration/deceleration control wherein move commands, from a distributing and interpolating section of a numerical control device, are passed through an acceleration/deceleration filter, whereby a feed axis is accelerated or decelerated.

Patent Literature 1 describes an example of a post-interpolation acceleration/deceleration control for a numerically controlled machine tool, wherein acceleration/deceleration curve parameters, corresponding to cutting feed rates of the numerically controlled machine tool are determined, whereby the acceleration and deceleration for the cutting feed is controlled based on the determined acceleration/deceleration curve parameters.

Patent Literature 2 describes a numerical control device including a post-interpolation acceleration/deceleration processing section for performing post-interpolation acceleration/deceleration processing on the move commands from an interpolation processing section, and axis servo-controlling sections for performing servo control for the respective feed axes, on the basis of the move commands after the post-interpolation acceleration/deceleration processing, whereby a post-interpolation acceleration/deceleration processing section performs velocity control with allowable inward-turning amount.

Further, Patent Literature 3 describes a precision positioning control apparatus comprising a composite servo system, which includes a coarse positioner and a fine positioner, wherein the sum of the displacements of the coarse positioner and the fine positioner is detected so that the sum is compared with the displacement command, the difference of which is supplied to adjusters of the coarse positioner and the fine positioner, whereby the adjusters output signals to be input into the coarse positioners and the fine positioners, respectively.

PRIOR ART DOCUMENTS

Patent Literature 1: JP-A-2001-312309
Patent Literature 2: JP-A-2001-312309
Patent Literature 3: JP-A-H08-241128

BRIEF SUMMARY OF THE INVENTION

Pre-interpolation acceleration/deceleration controls, as described in Patent Literatures 1 and 2, involve a problem that the acceleration/deceleration time is elongated, resulting in the longer machining time. Further, post-interpolation acceleration/deceleration controls involve a problem that when two or more feed axes are simultaneously controlled in order to machine for example a corner portion in the X-Y plane, the machining error is increased since the actual tool path extends along an inner arcuate course compared with a tool path based on the move commands before the acceleration/deceleration control.

Composite servo systems, as described in Patent Literature 3, involve a problem that mutually interfering forces are generated between the coarse and fine positioners due to the movement relative to each other, resulting in errors in the servo-control.

The invention is directed to solve the problems of the prior art, and the object of the invention is to provide a method of controlling a feed axis and a numerically controlled machine tool configured to carry out the feed axis controlling method, improved to reduce the impact generated by the changes in the acceleration and deceleration of the feed axis, and to machine a workpiece at high speed and with high accuracy.

In order to achieve the above described object, according to the invention, a method of controlling a feed axis of a machine tool, comprising obtaining differences between move commands and output values changeable based on move commands, generating move commands for the coarse motion mechanism based on the move commands, and generating move commands for the micro-motion mechanism based on the differences is provided.

Further, according to the invention, a method of controlling a feed axis of a machine tool configured to drive the feed axis composed of a coarse motion mechanism and a micro-motion mechanism so as to move a tool and a workpiece relatively to each other, whereby to machine the workpiece, comprising generating move commands for the coarse motion mechanism by passing move commands for the feed axis through a filter adapted to make acceleration continuous, driving the coarse motion mechanism by the move commands for the coarse motion mechanism, obtaining move commands for the micro-motion mechanism based on the differences between the move commands for the feed axis and the move commands for the coarse motion mechanism, and driving the micro-motion mechanism by the obtained move commands for the micro-motion mechanism is provided.

The coarse motion mechanism may be driven by the move commands for the feed axis, wherein the move commands for the micro-motion mechanism may be obtained based on the differences between the move commands for the feed axis and the feedback signals for the coarse motion mechanism so as to drive the micro-motion mechanism by the obtained move commands for the micro-motion mechanism.

Furthermore, a numerically controlled machine tool configured to run a numerical control program, from a reading and interpreting section of an NC device, in a distributing section and a servo-control section so as to drive a feed axis, composed of a coarse motion mechanism and a micro-motion mechanism, so that a tool and a workpiece are moved relative to each other, whereby the workpiece is machined, performing obtaining differences between move commands and output values changeable based on move commands, generating move commands for the coarse motion mechanism based on the move commands, and generating move commands for the micro-motion mechanism based on the differences.

The numerically controlled machine tool may comprise a filter adapted to make the acceleration according to the move commands continuous, means adapted to generate move commands for the coarse motion mechanism through the filter, and means adapted to generate move commands for the micro-motion mechanism based on the differences between the move commands for the feed axis and the move commands for the coarse motion mechanism.

According to the invention, the accelerations connoted in the move commands, which accelerations are suppressed by the acceleration/deceleration section in the prior art, are compensated by driving the micro-motion device so that the acceleration and deceleration of the respective feed axes can be increased, enabling the machining accuracy and the cutting efficiency to be increased.

DETAILED DESCRIPTION OF THE INVENTION

With reference to the attached drawings, a preferred embodiment of the invention will be described below.

Figure 1:
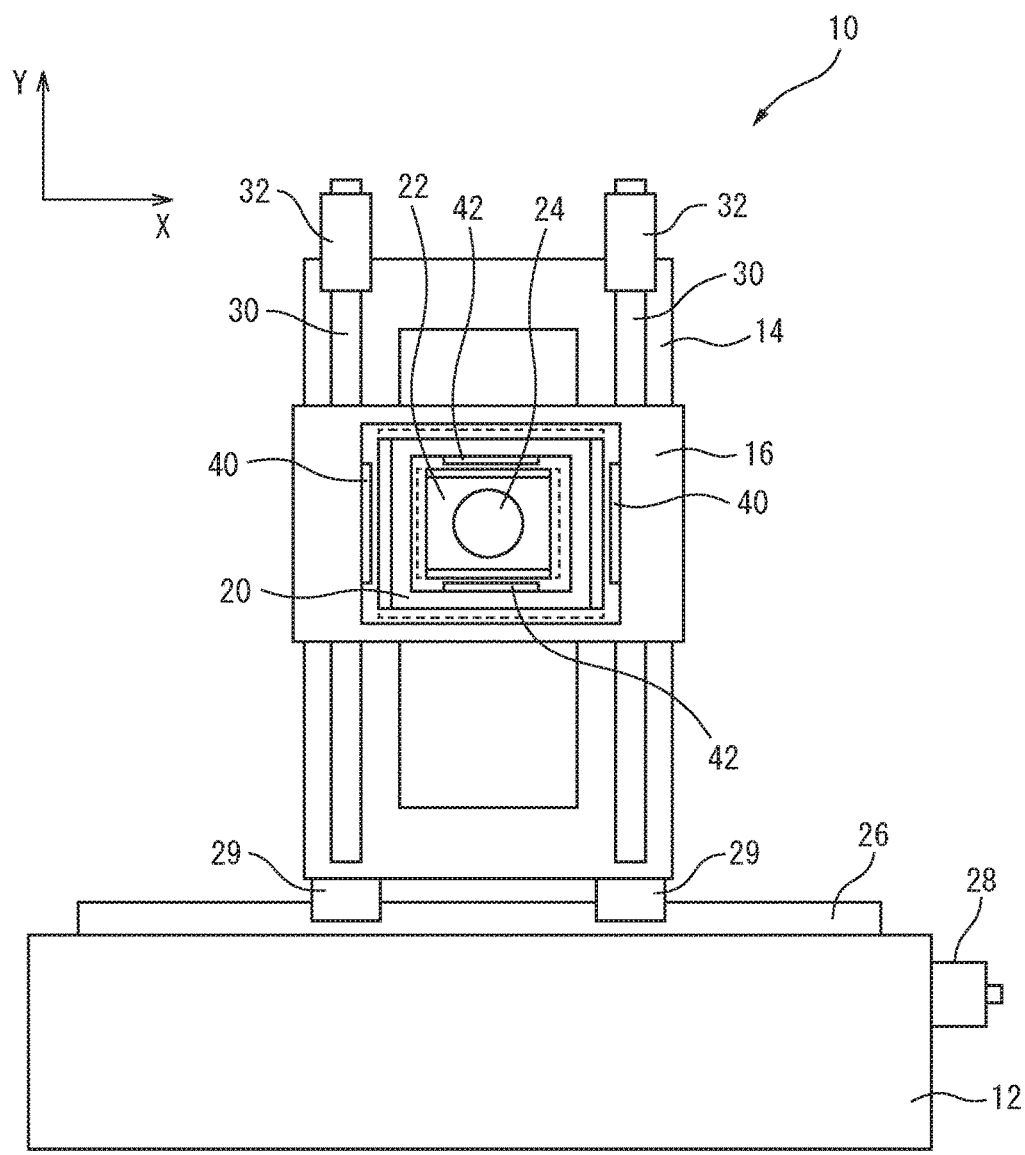
FIG. 1 is a front view showing an example of a numerically controlled machine tool to which the feed axis controlling method of the invention is applied.
Figure 2:
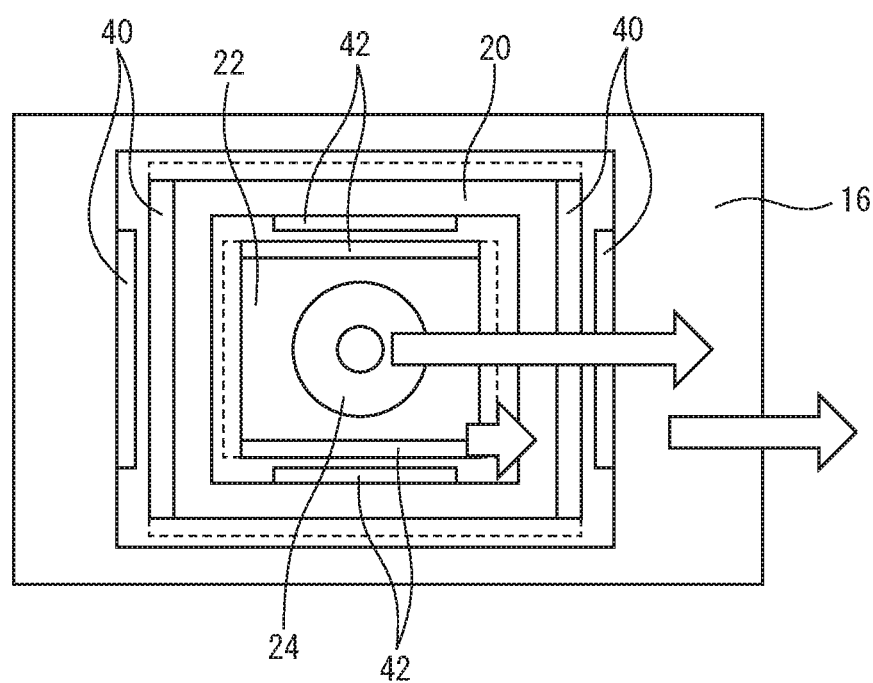
FIG. 2 is a partially enlarged illustration of a part of the numerically controlled machine tool of FIG. 1.

FIG. 1 is a front view showing an example of a numerically controlled machine tool to which a method of controlling a feed axis of the present invention is applied. FIG. 2 is a partially enlarged illustration of a part of the numerically controlled machine tool of FIG. 1.

In FIG. 1, the numerically controlled machine tool 10 comprises a bed 12 providing a base, a column 14 provided on the top of the bed 12 for moving in the horizontal left-and-right direction (X-axis direction), a Y-axis slider 16 mounted to the column 14 for moving in the vertical up-and-down direction (Y-axis direction), a headstock 20 mounted to the Y-axis slider 16 for moving in the up-and-down direction, and a spindle head 22, mounted to the headstock 20 for moving in the horizontal left-and-right direction, for supporting a spindle 24 for rotation about a rotational axis extending in the horizontal front-and-rear direction.

The column 14 has guide blocks 28 slideable on a pair of X-axis guide rails 26 extending in the horizontal left-and-right direction (the X-axis direction) along the top of the bed 12, and therefore is provided for reciprocating along the X-axis guide rails 26. A ball screw 36 (FIGS. 5 and 6), extending in the X-axis direction, and an X-axis servomotor 28 coupled to an end of the ball screw 36 are provided on the bed 12, as an X-axis feed device for reciprocally driving the column 14 along the X-axis guide rails 26. A nut 46 (FIGS. 5 and 7), engaging the ball screw 36, is mounted to the column 14. Further, an X-axis scale 48 (FIGS. 5 and 7), for measuring the X-axis coordinate position of the column 14, is mounted to the bed 12.

The Y-axis slider 16 is provided on a front face of the column 14 for reciprocating along a pair of Y-axis guide rails (not shown) extending in the vertical direction (the Y-axis direction). A pair of left-and-right ball screws 30 extending in the Y-axis direction and Y-axis servomotors 32 coupled to ends of the ball screws 30 are provided on the column 14 as a Y-axis feed device for reciprocally driving the Y-axis slider 16 along the Y-axis guide rails. A nut (not shown), engaging the ball screw 30, is mounted to the Y-axis slider 16. Further, a Y-axis scale (not shown), for measuring the Y-axis coordinate position of the Y-axis slider 16, is mounted to the column 14.

The headstock 20 is provided so as to be finely movable in the Y-axis direction relative to the column 14 via a Y-axis micro-motion device 40, while the spindle head 22 is provided so as to be finely movable in the X-axis direction relative to the headstock 20 via an X-axis micro-motion device 42. Although the configurations of the Y-axis micro-motion device 40 and the X-axis micro-motion device 42 are selected based on the required accuracies and the weights of the headstock 20 and the spindle head 22, they may be formed by linear motors or piezoelectric devices. In FIGS. 1 and 2, broken lines indicate the scopes of micro-motion in the Y- and X-axis directions. The micro-motion mechanism, driven by the X-axis micro-motion device 42 and the Y-axis micro-motion device 40, is configured to have inertia smaller than and rigidity greater than a coarse motion mechanism.

Further, the numerically controlled machine tool 10 comprises a position sensor (not shown) for detecting the relative position in the Y-axis direction of the headstock 20 relative to the Y-axis slider 16 and a position sensor 44 (refer to FIGS. 5 and 7) for detecting the relative position in the X-axis direction of the spindle head 22 relative to the headstock 20.

Figure 3:
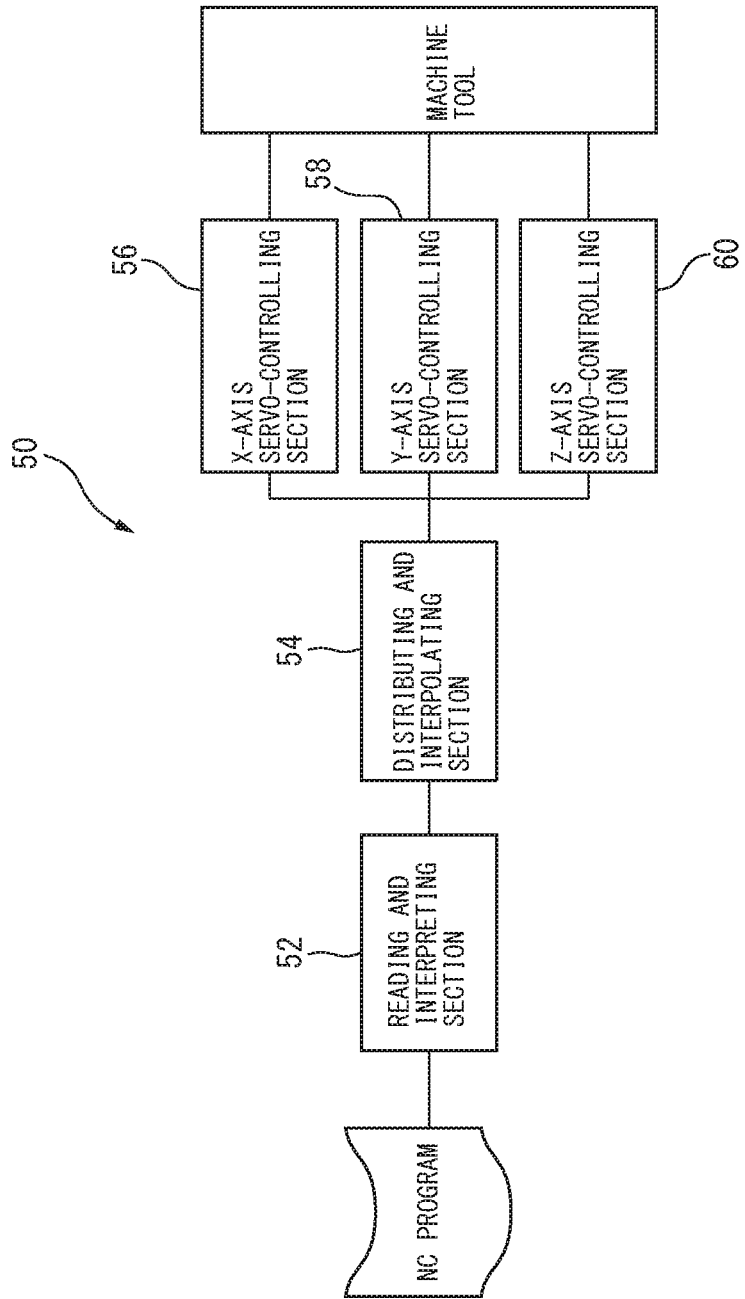
FIG. 3 is a schematic block diagram showing an example of a control system carrying out the feed axis controlling method of the invention.

With reference to FIG. 3, illustrating a schematic block diagram showing a control system for carrying out the method of controlling a feed axis of the invention, a control system 50 comprises a reading and interpreting section 52, a distributing and interpolating section 54 and X-, Y- and Z-axis servo-controlling sections 56, 58 and 60. The reading and interpreting section 52 reads and interprets a machining program fed from for example a CAM device (not shown) to output move commands to the distributing and interpolating section 54. The move commands include amounts of feed and feeding rates in the X-, Y- and Z-axis directions The distributing and interpolating section 54 performs the interpolation operation on the received X-, Y- and Z-axis move commands to output position commands, corresponding to interpolation functions and feed rates, to the servo-controlling sections 56, 58 and 60 of the respective axes. The servo-controlling sections 56, 58 and 60 output electric current values for driving the respective X-, Y- and Z-feed axes of the machine tool 10, based on the received position commands for the respective X-, Y- and Z-axes, to the servomotors 28 and 32 and the micro-motion device 40 and 42 of the X- and Y-axes, respectively.

Figure 4:
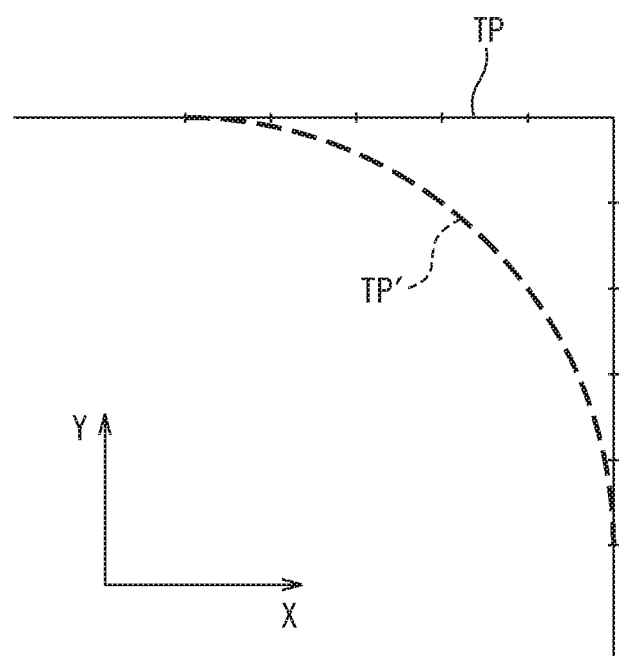
FIG. 4 is a schematic illustration showing tool paths for cutting a corner portion in the X-Y plane.

FIG. 4 illustrates a tool path when cutting a corner portion in the X-Y plane by using a tool for example a ball end mill. When machining such a corner portion, the position commands output from the distributing and interpolating section 54 are generally passed through a filter adapted to make acceleration continuous, in order to reduce the vibrations and impacts which may be generated when a moving part such as the column 14, the Y-axis slider 16, headstock 20, the spindle head 22 and the spindle 24 moves, and to ensure the continuity of the accelerations of the commands. This changes tool path TP based on the position commands from the distributing and interpolating section 54 to tool path TP' extending along an inner arcuate course as shown by the broken line in FIG. 4. The invention approximates the tool path TP', which is based on the position commands after filtered, to the tool path TP which is based on the position commands from the distributing and interpolating section 54 by using the micro-motion devices.

As a preferred embodiment of the invention, a servo-control device 100, forming the X-axis servo-controlling section 56 of FIG. 3, will be described below. It may be understood that the Y-axis servo-controlling section 58 and the Z-axis servo-controlling section 60 can be similarly formed by the servo-control device 100.

Figure 5:
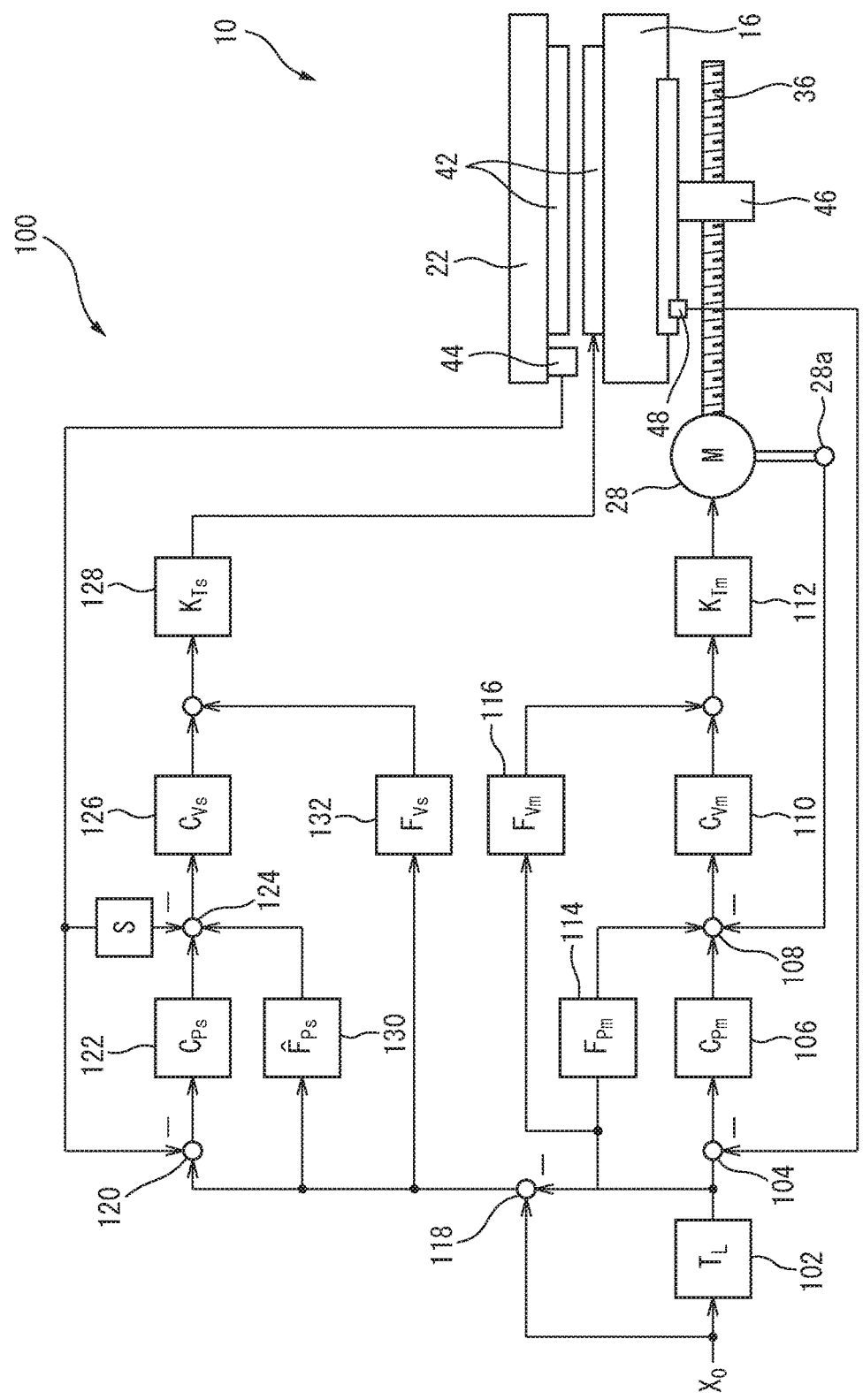
FIG. 5 is a control block diagram showing a servo-controlling device according to a first embodiment of the invention.

With reference to FIG. 5, the servo-control device 100 according to a first embodiment of the invention includes, similar to conventional servo-control devices, an acceleration/deceleration filter 102 for position commands Xs from the distributing and interpolating section 54, a subtractor 104 for comparing the position commands from the acceleration/deceleration filter 102 and position feedback signals from the X-axis scale 48, a position controller 106 for performing a differential operation on the outputs from the subtractor 104, a subtractor 108 for comparing the outputs from the position controller 106 and velocity feedback signals from the rotary encoder of the X-axis servomotor 28, a velocity controller 110 for performing a differential operation on the signals from the subtractor 108, a current controller 112 for controlling the electric current output to the X-axis servomotor 28 based on the outputs from the velocity controller 110, a velocity feedforward controller 114 and an acceleration feedforward controller 116 for generating velocity feedforward values and acceleration feedforward values based on the position commands from the acceleration/deceleration filter 102.

The servo-control device 100 further includes subtractor 118 for comparing the position commands from the distributing and interpolating section 54 and the position commands from the acceleration/deceleration filter 102, a subtractor 120 for comparing the outputs from the subtractor 118 and the position feedback signals from the position sensor 44, a micro-motion position controller 122 for performing a differential operation on the outputs from the subtractor 120, a subtractor 124 for comparing the outputs from the micro-motion position controller 122 and the signals from the position sensor 44 after the differential operation, a micro-motion velocity controller 126 for performing a differential operation on the signals from the subtractor 124, a micro-motion current controller 128 for controlling the electric current output to the X-axis micro-motion device 42 based on the outputs from the micro-motion velocity controller 126, a micro-motion velocity feedforward controller 130 and a micro-motion acceleration feedforward controller 132 for generating micro-motion velocity feedforward values and micro-motion acceleration feedforward values based on the outputs from the subtractor 118.

In this embodiment, the X-axis micro-motion device 42 is controlled so as to compensate the differences between the position commands from the distributing and interpolating section 54 and the outputs from the acceleration/deceleration filter 102. Therefore, according to this embodiment, it is possible to approximate the tool path TP' based on the position commands after being filtered to the tool path based on the position commands from the distributing and interpolating section 54. Further, in the prior art, large accelerations connoted in the position commands are suppressed by a filter. In this embodiment, the suppressed accelerations are compensated by driving the micro-motion devices, enabling the servomotors 28 and 32 of the X- and Y-axes to be increased, whereby the machining accuracy and the cutting efficiency can be increased.

Figure 6:
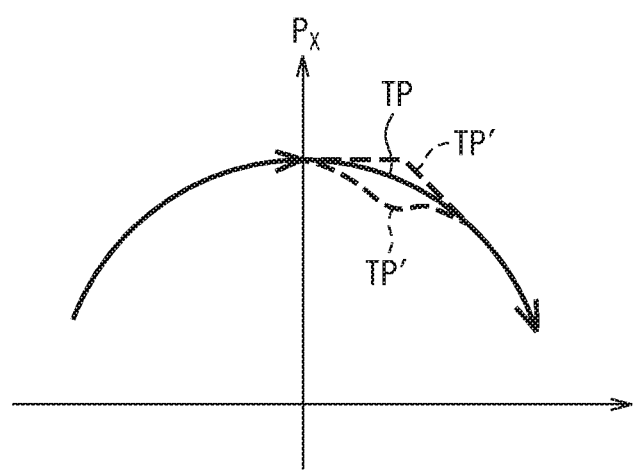
FIG. 6 is a schematic illustration showing deviation of tool path when machining along an arcuate or curved tool path.

Further, even if a tool path TP extends along an arc or a curve as shown in FIG. 6, the actual tool path may be deviated from the tool path TP, which is based on the position commands from the distributing and interpolating section, as shown by broken line TP', since delays of the feed axes are caused by changes in the friction acted on the moving parts of a machine tool.

Figure 7:
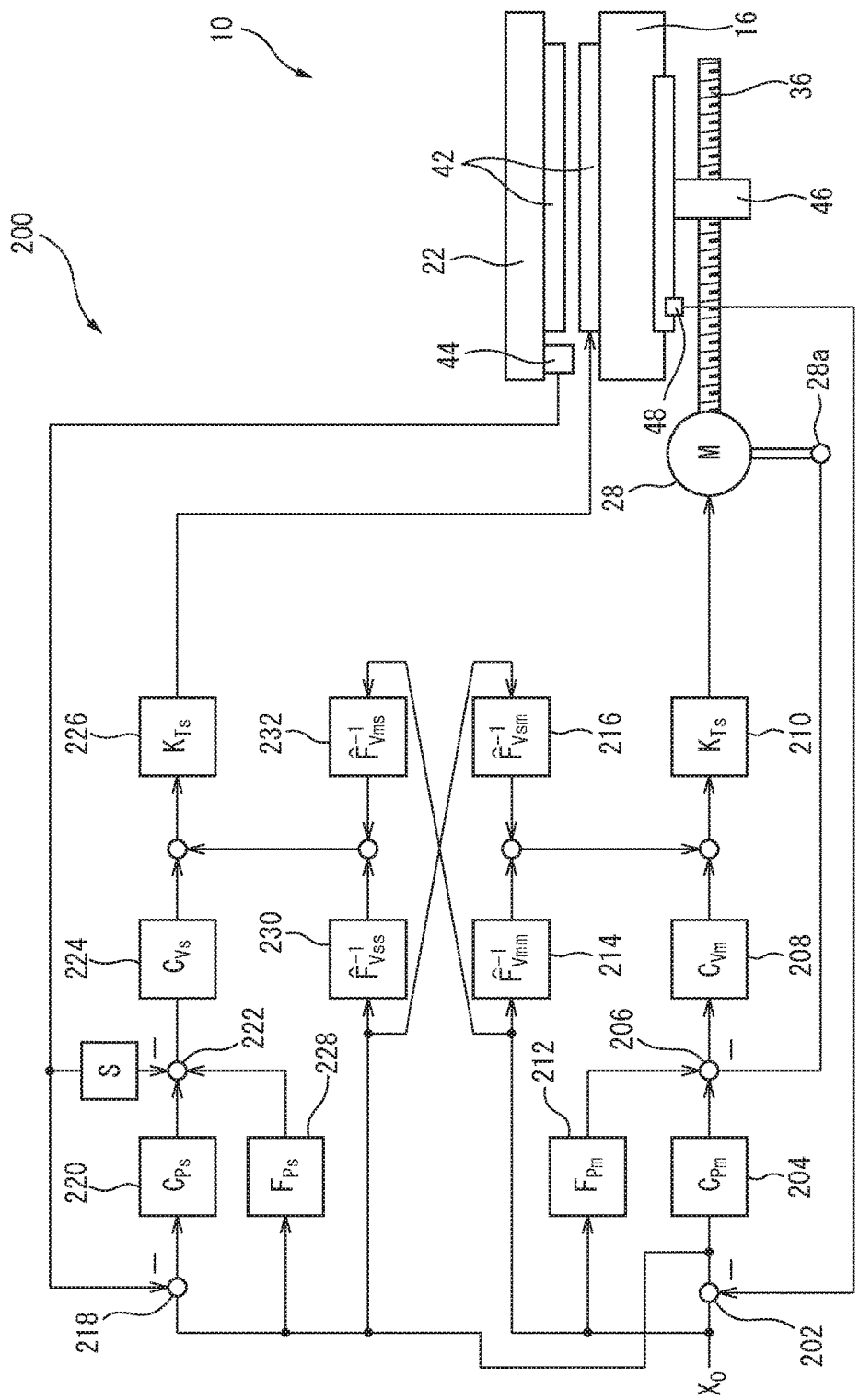
FIG. 7 is a control block diagram showing a servo-controlling device according to a second embodiment of the invention.

With reference to FIG. 7, a servo-controlling device 200 according the a second embodiment of the invention includes, similar to conventional servo-controlling devices, a subtractor 202 comparing the position commands X0 from the distributing and interpolating section 54 and the position feedback signals from the X-axis scale 48, a position controller 204 for performing a differential operation on the outputs from the subtractor 202, a subtractor 206 for comparing the outputs from the position controller 204 and the velocity feedback signals from the rotary encoder 28a of the X-axis servomotor 28, a velocity controller 208 for performing a differential operation on the outputs from the velocity controller 208, a current controller 210 for controlling the electric current output to the X-axis servomotor 28 based on the outputs from the velocity controller 208, a velocity feedforward controller 212 and an acceleration feedforward controller 214 for generating velocity feedforward values and acceleration feedforward values based on the position commands X0 from the distributing and interpolating section 54.

The servo-controlling device 200 further includes a subtractor 218 for comparing the outputs from the subtractor 202 and the position feedback signals from the position sensor 44, a micro-motion position controller 220 for performing a differential operation on the outputs from the subtractor 218, a subtractor 222 for comparing the outputs from the micro-motion position controller 220 and the signals from the position sensor 44 after the differential operation, a micro-motion velocity controller 224 for performing a differential operation on the signals from the subtractor 222, a micro-motion current controller 226 for controlling the electric current to be output to the X-axis micro-motion device 42 based on the outputs from the micro-motion velocity controller 224, a micro-motion velocity feedforward controller 228 and a micro-motion acceleration feedforward controller 230 for generating micro-motion velocity feedforward values and micro-motion acceleration feedforward values based on the outputs from the subtractor 202.

The servo-controlling device 200 can effectively reduce machining errors due to changes in the friction acted on the moving parts of a machine tool, as shown in FIG. 6. Such errors are small, and therefore the micro-motion device 42 may be a driving device comprising piezoelectric devices, instead of linear motors. In this case, mutually interfering forces may be generated, via the piezoelectric devises, between the Y-axis slider 16, providing a coarse motion mechanism, and the spindle head 22 or the headstock 20, providing a micro-motion mechanism. Therefore, in this embodiment, the servo-controlling device 200 feeds the mutually interfering forces, acting on the coarse motion mechanism and the micro-motion mechanism, forward to the current controller 210 and the micro-motion current controller 226. For this purpose, an interference acceleration feedforward controller 216, for generating interference acceleration feedforward values based on the outputs from the subtractor 202, and a micro-motion interference acceleration feedforward controller 232, for generating micro-motion interference acceleration feedforward values based on the position commands X0 from the distributing and interpolating section 54, are provided.

REFERENCE SIGNS LIST

10 Numerically Controlled Machine Tool
12 Bed
14 Column
16 Y-axis slider
20 Headstock
22 Spindle Head
24 Spindle
40 Y-axis Micro-motion Device
42 X-axis Micro-motion Device
100 Servo-Controlling Device
102 Acceleration/Deceleration Filter
114 Velocity Feedforward Controller
116 Acceleration Feedforward Controller
130 Micro-motion Velocity Feedforward Controller
132 Micro-motion Acceleration Feedforward Controller
212 Velocity Feedforward Controller
214 Acceleration Feedforward Controller
216 Interference Acceleration Feedforward Controller
228 Micro-motion Velocity Feedforward Controller
230 Micro-motion Acceleration Feedforward Controller
232 Micro-motion Interference Acceleration Feedforward Controller

The invention claimed is:

1. A method of controlling a feed axis of a machine tool configured to drive the feed axis composed of a coarse motion mechanism and a micro-motion mechanism so as to move a tool and a workpiece relatively to each other, whereby to machine the workpiece, the method comprising:
generating move commands for the coarse motion mechanism by passing move commands for the feed axis through a filter adapted to make acceleration continuous;
obtaining differences between the move commands for the coarse motion mechanism and position feedback signals output from a scale for measuring the coordinate value of the feed axis;
driving the coarse motion mechanism based on the differences;
generating move commands for the micro-motion mechanism based on the differences between the move commands for the feed axis before passing through the filter and the move commands for the coarse motion mechanism after passing through the filter; and
driving the micro-motion mechanism based on difference between the generated move commands for the micro-motion mechanism and position feedback signals from a position sensor for the micro-motion mechanism.

2. The method of controlling a feed axis of a machine tool according to claim 1, wherein velocity feedforward values and acceleration feedforward values for the coarse motion mechanism are generated based on the move commands after passing through the filter.

3. The method of controlling a feed axis of a machine tool according to claim 2, wherein velocity feedforward values and acceleration feedforward values for the micro-motion mechanism are generated based on the move commands before passing through the filter.

4. A numerically controlled machine tool configured to run a numerical control program, from a reading and interpreting section of a numerically controlled device, in a distributing section and a servo-control section so as to drive a feed axis, composed of a coarse motion mechanism and a micro-motion mechanism, so that a tool and a workpiece are moved relative to each other, whereby the workpiece is machined, the numerically controlled machine tool comprising:
an acceleration/deceleration filter adapted to generate move commands for the coarse motion mechanism by passing move commands for the feed axis therethrough;
a current controller adapted to output electric current for driving the coarse motion mechanism based on differences between the move commands for the coarse motion mechanism and position feedback signals output from a scale for measuring the coordinate value of the feed axis;
a subtractor adapted to generate move commands for the micro-motion mechanism based on differences between the move commands for the feed axis before passing through the acceleration/deceleration filter and the move commands for the coarse motion mechanism after passing through the acceleration/deceleration filter; and
a micro-motion current controller adapted to output electric current for driving the micro-motion mechanism based on differences between the move commands for the micro-motion mechanism and position feedback signals from a position sensor for the micro-motion mechanism.

* * * * *